(12) United States Patent
Cunnings

(10) Patent No.: US 9,576,406 B2
(45) Date of Patent: Feb. 21, 2017

(54) DETERMINING A REMEDIAL ACTION FOR A MOTORIZED VEHICLE BASED ON SENSED VIBRATION

(71) Applicant: Hewlett-Packard Development Company, L.P., Houston, TX (US)

(72) Inventor: Joseph Oliver Cunnings, Troy, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/759,837

(22) PCT Filed: Jan. 22, 2013

(86) PCT No.: PCT/US2013/022450
§ 371 (c)(1),
(2) Date: Jul. 8, 2015

(87) PCT Pub. No.: WO2014/116197
PCT Pub. Date: Jul. 31, 2014

(65) Prior Publication Data
US 2015/0363983 A1    Dec. 17, 2015

(51) Int. Cl.
| | |
|---|---|
| *G01H 1/00* | (2006.01) |
| *G07C 5/08* | (2006.01) |
| *G01M 17/007* | (2006.01) |
| *B60K 35/00* | (2006.01) |
| *B60Q 9/00* | (2006.01) |
| *G07C 5/00* | (2006.01) |
| *G01M 17/00* | (2006.01) |

(52) U.S. Cl.
CPC ............. *G07C 5/0808* (2013.01); *B60K 35/00* (2013.01); *B60Q 9/00* (2013.01); *G01H 1/00* (2013.01); *G01M 17/007* (2013.01); *G07C 5/008* (2013.01)

(58) Field of Classification Search
CPC .......... H01H 1/00; G01M 17/00; B60K 35/00; C07C 5/00
USPC ..... 701/29.1, 31.4, 30.5, 33.7, 34.4; 702/56, 702/39
See application file for complete search history.

(56) References Cited

U.S. PATENT DOCUMENTS

| | | | |
|---|---|---|---|
| 6,718,235 B1* | 4/2004 | Borugian | ................ B60R 25/04 307/10.2 |
| 7,283,914 B2 | 10/2007 | Poorman et al. | |

(Continued)

FOREIGN PATENT DOCUMENTS

| | | |
|---|---|---|
| BE | 1018513 | 2/2011 |
| EP | 1437272 | 7/2004 |

(Continued)

OTHER PUBLICATIONS

PCT; "Notification of Transmittal of the International Search Report and the Written Opinion of the International Seraching Authority, or the Declaration"; cited in PCT/US2013/022450; mailed Oct. 24, 2013; 11 pages.

(Continued)

*Primary Examiner* — Tan Q Nguyen
(74) *Attorney, Agent, or Firm* — Trop, Pruner & Hu, P.C.

(57) ABSTRACT

An apparatus that includes a vibration sensor and a circuit. The vibration sensor provides an indication of vibration sensed in a motorized vehicle. The circuit determines a remedial action to be taken for the motorized vehicle based at least in part on the sensed vibration.

13 Claims, 3 Drawing Sheets

(56) References Cited

U.S. PATENT DOCUMENTS

| | | | |
|---|---|---|---|
| 7,487,679 B2* | 2/2009 | Sirrine | G01H 1/003 |
| | | | 702/39 |
| 8,024,084 B2 | 9/2011 | Breed | |
| 2003/0088346 A1* | 5/2003 | Calkins | G01H 1/003 |
| | | | 701/31.4 |
| 2004/0243285 A1* | 12/2004 | Gounder | G07C 5/008 |
| | | | 701/1 |
| 2004/0243351 A1 | 12/2004 | Calkins et al. | |
| 2005/0066730 A1* | 3/2005 | Raichle | G01N 29/14 |
| | | | 73/579 |
| 2006/0064210 A1* | 3/2006 | Aubourg | G01H 3/08 |
| | | | 701/3 |
| 2008/0177683 A1 | 7/2008 | No et al. | |
| 2010/0152960 A1* | 6/2010 | Huber | G06Q 10/06 |
| | | | 701/31.4 |
| 2010/0211249 A1 | 8/2010 | McClellan et al. | |
| 2011/0022263 A1 | 1/2011 | Sanchez-Prieto Aler et al. | |
| 2012/0130607 A1 | 5/2012 | Koenig et al. | |

FOREIGN PATENT DOCUMENTS

| | | |
|---|---|---|
| JP | 06229818 | 8/1994 |
| JP | 2006194629 | 7/2006 |
| KR | 100418117 | 1/2004 |
| WO | WO-2011072879 | 6/2011 |

OTHER PUBLICATIONS

Shiwu, Li. et al.; "Research on Method for Real-time Monitoring Dynamic Vehicle Loading Based on Multi-sensors"; Aug. 19-22, 2011; pp. 729-732.

European Patent Office, "The extended EP Search Report"; European Patent Application No. 13872715.1-1559/2948744 PCT/US2013/022450; Mailed Aug. 25, 2016, 9 pages.

* cited by examiner

DETERMINING A REMEDIAL ACTION FOR A MOTORIZED VEHICLE BASED ON SENSED VIBRATION

BACKGROUND

An onboard diagnostic system of a motorized vehicle typically provides a snapshot of the current state of the vehicle. For this purpose, the vehicle may have sensors to measure various parameters, such as fluid levels, voltages, temperatures and pressures. The information that is acquired by the onboard diagnostic system may be used, for example, by personnel of a repair shop to diagnose the underlying cause of a problem that prompted the vehicle owner to bring the vehicle to the shop for service.

DETAILED DESCRIPTION

Figure 1:
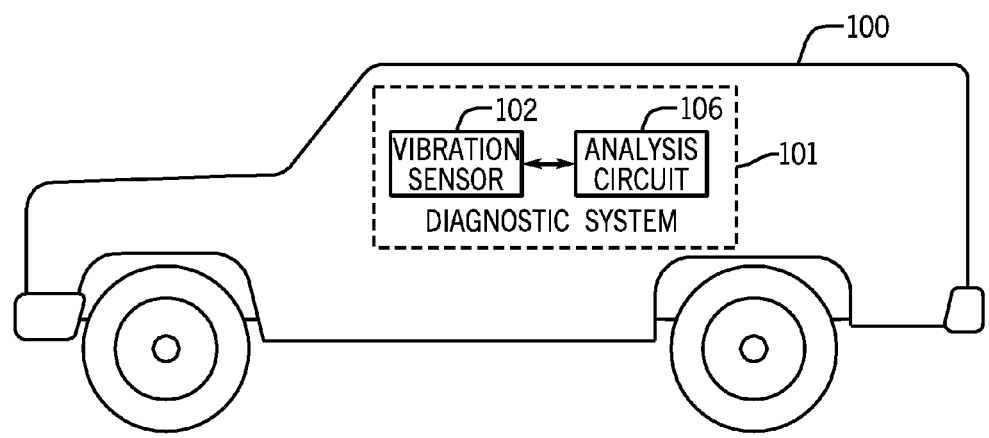
FIG. 1 is a schematic diagram of a vibration-based diagnostic system for a motorized vehicle according to an exemplary implementation.

Referring to FIG. 1, in accordance with an exemplary implementation, a motorized vehicle 100 (an automobile, a motorcycle, a truck, a watercraft, an aircraft, and so forth) includes an onboard vibration-based diagnostic system 101 for purposes of determining remedial actions to be taken for the vehicle 100 based on sensed vibration. In this manner, the diagnostic system 101 includes at least one vibration sensor 102 for purposes of sensing vibrations (vibration patterns, for example) that occur in connection with the operation of the vehicle 100. A vibration analysis circuit 106 of the diagnostics system 101 is constructed to discriminate "normal" vibrations from "abnormal" vibrations for purposes of 1. identifying recognized abnormal vibrations that correspond to problems for which remedial actions have been determined to correct/address the problems; and 2. further identifying when vibrations are abnormal (but unrecognized) so that these vibrations may be further processed (as disclosed herein) to identify corresponding problems. The remedial actions include actions to address maintenance issues (an action of taking the vehicle to the dealer for service, for example) as well as actions to address immediate safety concerns (an action of pulling over and stopping driving the motorized vehicle as soon as possible, for example).

More specifically, in accordance with exemplary implementations, based on the sensed vibration indication(s) provided by the vibration sensor(s) 102, the vibration analysis circuit 106 may directly alert an operator of the motorized vehicle 100 (via an onboard display, warning light or audible alarm, as examples) if a recognized abnormal vibration is detected, which corresponds to an immediate safety concern (a tire is about to at disintegrate, a tie rod is near its failure point, and so forth) so that the operator may take immediate corrective action (an action involving stopping the motorized vehicle, for example). Moreover, as further disclosed herein, in accordance with exemplary implementations, the vibration analysis circuit 106 may use a remotely-disposed communication facility to indirectly communicate less urgent messages (emails, text messages and so forth) to the vehicle's owner when a recognized abnormal vibration is detected, which corresponds to a less serious maintenance issue (a wiper blade needs to be replaced, for example).

Among the potential advantages of an onboard vibration-based diagnostic system are that the vehicle operator may be notified of immediate safety issues, such as a tire beginning to break down or a steering component under stress; and for less serious issues, the vehicle owner may be sent a monthly report on the overall performance of the vehicle, coupling the vibration information with other information that may be acquired by one or more other diagnostic systems of the vehicle, such as an OnStar® vehicle diagnostic report, for example. Dealers may be notified of imminent maintenance issues so that a proactive notice (a notice with a discounted service coupon, for example) may be communicated to the owner of the motorized vehicle 100, informing the owner, for example, that the wheel bearings are beginning to break down and need to be repaired in a certain number of miles.

Fleet operators may be communicated summary information of advanced analytics across their vehicle fleet to guide decisions about maintenance issues, fleet performance and possibly even driver performance. The original equipment manufacturer (OEM) may be sent, for example, a monthly summary of the advanced analytics information on the wear and tear of the vehicle to aid in assessing warranty liabilities, potential recalls, product performance, life expectancy, and so forth. Moreover, the tier one automotive suppliers may also be communicated such information.

Figure 2:
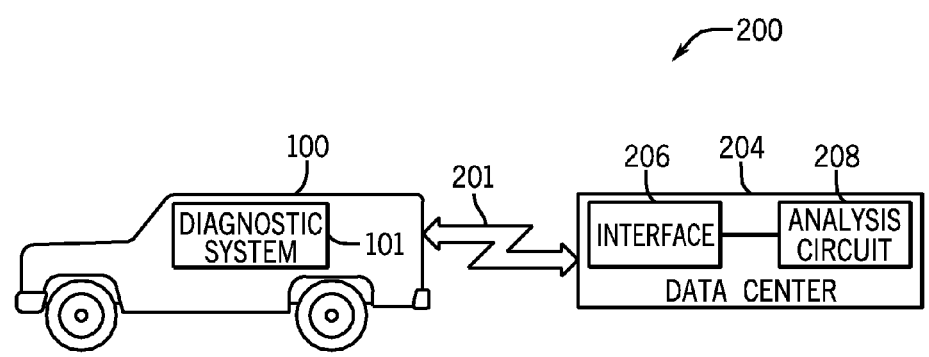
FIGS. 2 and 3 depict systems that use analyses of vibrations sensed on a motorized vehicle to determine remedial actions to be taken for the vehicle according to exemplary implementations.

Referring to FIG. 2, in accordance with example implementations, the onboard diagnostic system 101 may be part of a networked system 200, which is used to supplement communications and vibration analyses for the system 101. In accordance with exemplary implementations, the networked system 200 includes a data center 204 that is remotely disposed with respect to the motorized vehicle 100 and may communicate with the diagnostic system 101 using one of many different communication fabrics, such as cellular fabric, wired fabric, wide area network (WAN)-based fabric, a combination of such fabric and so forth. Although not depicted in FIG. 2, the data center 204 may serve as a central hub for facilitating communications and vibration analyses for one or multiple motorized vehicles other than the depicted motorized vehicle 100. Thus, in accordance with some implementations, the data center 204 may serve as a central hub, for example, for motorized vehicles 100 provided by a manufacturer shared in common, motorized vehicles 100 belonging to the same subscriber-based service, and so forth.

Depending on the particular exemplary implementation, the data center 204 may perform one or more of the following functions: notifying vehicle owners of maintenance issues for their vehicles; notifying fleet owners, original equipment manufacturers (OEMs) and dealers of repairs and repair issues for their associated vehicles; receiving and logging vibration records gathered by motorized vehicles, such as the motorized vehicle 100; analyzing vibration records gathered from a class of similar motorized vehicles (vehicles having the same make, model and year, for example) to identify common problems and attribute these common problems to similar vibration patterns; and populating the diagnostic system 101 of the motorized vehicles with vibration patterns that are linked to the associated common problems and remedial actions.

More specifically, the onboard diagnostic system 101 may communicate data to the data center 204, which represents "abnormal" vibration records. These records may correspond to recognized vibration signatures, or patterns, that have already been attributed to associated problems, as well as unrecognized vibration patterns that have been captured for further analysis due to the patterns exceeding certain thresholds (vibration duration, amplitudes, frequencies, and so forth). In this manner, the datacenter 204 may include an interface 206 for purposes of receiving data that represents abnormal vibration records (recognized and unrecognized) from the motorized vehicles, as further disclosed herein.

The data center 204 includes an analysis circuit 208 for purposes of analyzing vibration records for a particular individual motorized vehicle, as well as analyzing vibration records across motorized vehicles of the same classification, such as motorized vehicles that share the same make, model and year, for example. The analysis circuit 208 provides results that may be used to inform motorized vehicle owners of maintenance needs and predict potential warranty and recall issues, which also may be sent to the original equipment manufacturer (OEM), supplier, dealer, fleet operator, and so forth.

Figure 3:
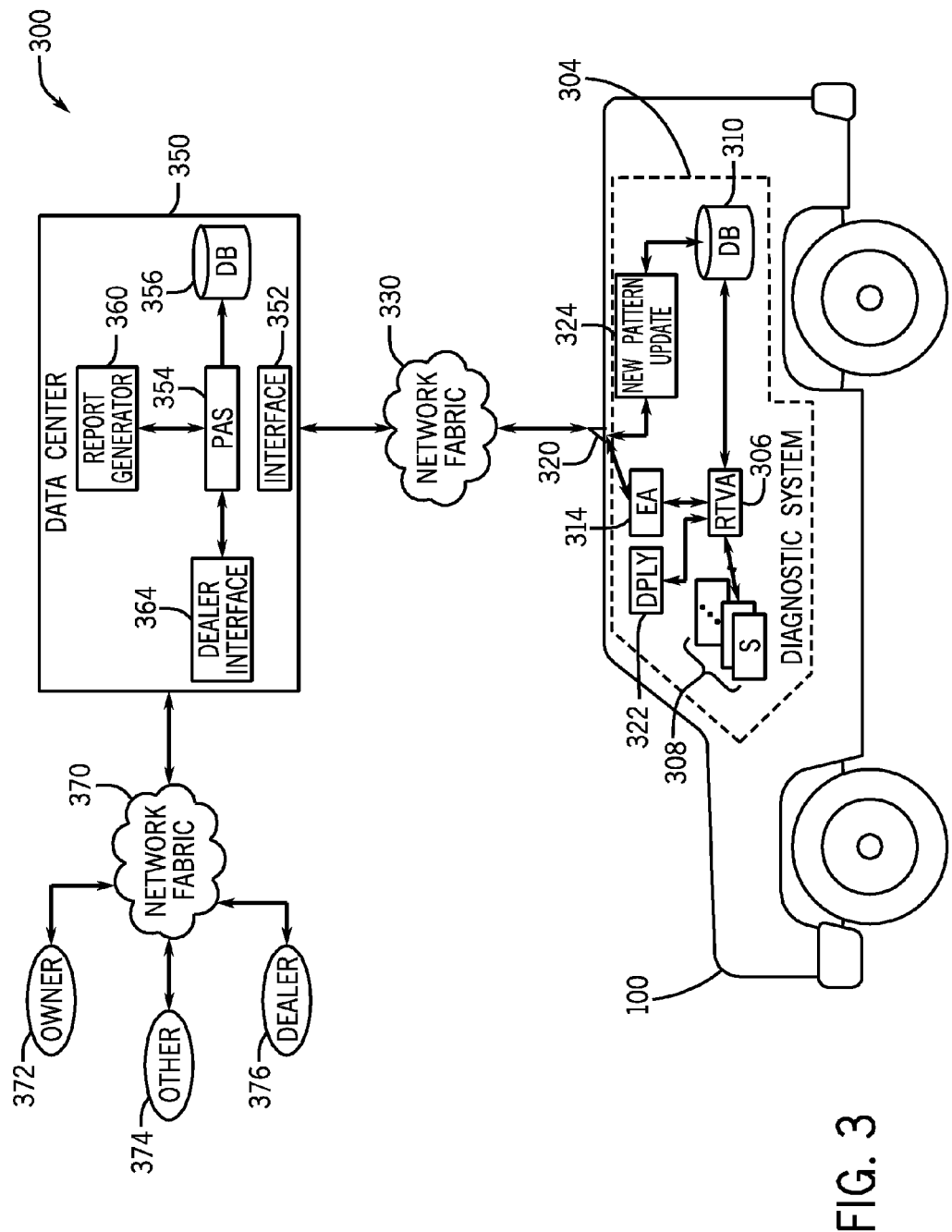

FIG. 3 depicts a more detailed schematic view of a networked-based vibration-based vibration diagnostic system 300 in accordance with an exemplary implementation. In general, the system 300 includes a data center 350, or "hub," and onboard, vibration diagnostic systems 304 (one being depicted in FIG. 3) that are disposed on motorized vehicles 100 (one being depicted in FIG. 3) for purposes of sensing vibration that occurs during operations of the associated vehicles 100 and taking the appropriate actions based on the sensed vibrations.

For this example, the diagnostic system 304 includes a network of vibration sensors 308 that are disposed on the motorized vehicle 100 for purposes of sensing vibrations that may occur during the operation of the vehicle 100. In this manner, the vibration sensors 308 may be spatially distributed about the motorized vehicle 100 in an array to sense vibrations and vibration patterns that may be generated by the systems of the motorized vehicle 100, such as the powertrain, the drive train, the steering control system, the tires, the exhaust system, and so forth.

In general, the vibration sensor 308 may be any sensor that is constructed to sense vibration and provide a signal indicating the sensed vibration, such as a geophone, an accelerometer, a microelectromechanical system (MEMS)-based motion sensor, and so forth. It is noted that although FIG. 3 depicts a single motorized vehicle 100, the system 300 may contain one or multiple such motorized vehicles 100, depending on the particular implementation.

The vibration sensors 308 sense vibrations that occur during the operation of the motorized vehicle 100 for purposes of allowing the diagnostic system 304 to identify certain vibration patterns, or signatures. The diagnostic system 304 discriminates "normal" vibrations from "abnormal" vibrations. In this manner, in accordance with an exemplary implementation, the diagnostic system 304 includes a real time vibration analytics (RTVA) engine 306 that is coupled to the vibration sensors 308 for purposes of identifying vibration signatures, or patterns, that are indicative of potential safety concerns and/or maintenance issues.

In accordance with an exemplary implementation, the RTVA engine 306 compares sensed vibration patterns to vibration patterns that correspond to previously-recognized maintenance and/or safety issues, which are stored in a database 310 onboard the motorized vehicle 304. The comparison may involve comparing any of a number of vibration signatures or patterns, such as vibration amplitude-time profiles, spectral energies, spectral distributions, spectral envelopes, amplitude-time profiles and so forth, depending on the particular implementation. Based on this comparison and possibly the consideration of other information (sensed parameters other than vibration, the spatial location of the sensed vibration, the age or mileage of the motorized vehicle 100 and so forth), the RTVA 306 determines if the sensed vibration pattern corresponds to a particular problem and remedial action.

In the event that an abnormal vibration is identified as an early indicator of a maintenance issue but not an immediate safety concern (as indicated by a data stored in the database 310, for example), the RTVA engine 306 uses an event alert module 314 of the diagnostic system 304 to communicate data representing the corresponding vibration record to the remotely-disposed data center 350 so that the pattern may be logged and communications may be made (if appropriate) with the vehicle owner concerning any potential maintenance action. In this manner, the event alert module 314 may be coupled to an antenna 320 that is coupled to the remote data center 350 via network fabric 330. In accordance with an exemplary implementation, the network fabric 330 may be a cellular network. WAN-based fabric, Internet-based fabric or a combination or such fabric, as examples. The data center 350 includes an interface 352 that receives data indicative of such vibration records.

After transmitting a record corresponding to an initial abnormal vibration pattern, in accordance with some implementations, the event alert module 314 may send a daily update record to the data center 350, which indicates the number of trips and durations of trips taken by the motorized vehicle 100 and an indication of whether the associated abnormal vibration pattern was sensed during each of these trips. If a particular vibration pattern is not sensed for several days (configurable based on the type of abnormal vibration pattern, for example), the RTVA engine 306 may send a record to the data center 350 indicating the vibration problem has been resolved.

It is noted that any day of non-driving does not produce a record. Therefore, in accordance with some implementations, upon the next day of driving (after any number of non-driving days), the RTVA engine 306 communicates a record to the data center 350 indicating the number of non-driving days in addition to the normal daily report. In accordance with some implementations, the RTVA 306 communicates the previous day's record upon vehicle startup on the next day, because the RTVA 306 does not know which trip is the last trip for the motorized vehicle 100 for the day.

In the case that the abnormal vibration pattern is identified as being an immediate safety issue (a tire beginning to break down or a tie rod that is about to fail, as examples), the RTVA engine 306 uses the event alert module 314 to immediately and directly alert the operator of the motorized vehicle 100 via a display 322 (as an example) of the vehicle 304 so that the operator may take immediate action to avert an otherwise dangerous situation. For example, the display 322 may be an onboard display within the motorized vehicle 304, such as a light emitting diode (LED) screen or display. The alert may be provided by other alarm devices that provide audible and/or visual alarms, for example. Moreover, as in the case with a maintenance issue that is not an immediate concern, the RTVA engine 306 may also use the event alert module 314 for purposes of communicating the identified safety issue and associated vibration record, along with other information, to the data center 350 so that the data center 350 may alert the owner 372, dealer 376 and potentially other 374 (OEM fleet managers and so forth) parties using less direct communications (emails, texts, automatically-generated letters, statistical reports, and so forth).

In accordance with some implementations, the data center 350 may contain the following components to further analyze the data provided by the event alert module 314, as well as information provided by the event alert module 314 of other motorized vehicles 100. In general, the data center 350 may include a predictive analytics system (PAS) engine 354 that performs advanced analytics on vibration records that have yet been linked to a particular problem/remedial action for purposes of adaptively learning which vibration patterns correspond to which problems. The PAS engine 354 may take advantage of the relatively large amount of vibration record data that are provided by a relatively large number of motorized vehicles 100, as well as information that may be gleaned from online dealer maintenance records In this manner, in accordance with some implementations, the PAS engine 354 is coupled to a dealer interface 364 of the data center 350, which communicates (via network fabric 370, for example), with the appropriate dealer 376 for a given motorized vehicle 100 for purposes of correlating vibration records with maintenance records for the motorized vehicle 100 (identified individually by the motorized vehicle 100's unique Vehicle Identification Number or VIN for example). Depending on the particular implementation, the network fabric 370 may be cellular-based fabric, Internet-based fabric, WAN-based fabric, and so forth, depending on the particular implementation. The correlation that is performed by the PAS engine 354 may be used to learn the root cause of new and/or unknown vibration patterns. In this manner, by correlating actual maintenance records of, for example, vehicles of the same make/model/year, with the vibration records acquired from these vehicles, the PAS engine 354 may learn that certain vibration patterns are highly correlated with certain problems.

For example, motorized vehicles of the same make/model/year may each experience a similar vibration pattern due to a muffler mount failing. Although not attributable to a particular recognized vibration pattern at the time, the RTVA engine 306 for each of these motorized vehicles may determine that the vibration pattern is abnormal (i.e., surpasses certain thresholds for deeming the pattern to be abnormal) and may communicate the corresponding vibration record to the data center 350. The PAS engine 354 may examine the dealer maintenance records and determine that a significant correlation exists for vehicles that experienced the vibration pattern and vehicles that were taken in for repair of the muffler mount.

Moreover, based on dealer maintenance records and logs communicated by the event alert modules 314 of the motorized vehicles 100, the PAS engine 354 may determine that the vibration patterns disappeared for motorized vehicles 300 that had their muffler mounts repaired. Based on its analysis, for this example, the PAS engine 354 may identify the vibration pattern as being an indicator for maintenance for the muffler mount. Therefore, the PAS engine 354 may populate the databases of all of the motorized vehicles 100 having the same make/model/year with the corresponding vibration record, which identifies, for example, the vibration pattern indicative of the problem, a description of the identified problem and a description of the corresponding remedial action.

In accordance with exemplary implementations, for purposes of updates, newly-learned vibration patterns (i.e., vibration patterns that have been correlated to certain problems) may be stored in a database 356 of the data center 350; and the newly-learned patterns may be communicated to the motorized vehicles 100 so that newly-learned patterns may be used by the RTVA engines 306 of these motorized vehicles 100 for purposes of identifying problems (and corresponding remedial actions) based on these vibration patterns. In this manner, in accordance with some implementations, the motorized vehicle 100 includes a new pattern updater module 324 that receives data representing records of such newly-learned vibration patterns and stores these records in the motorized vehicle's database 310. In accordance with some implementations, the updates may be communicated as part of a monthly update.

In accordance with some implementations, the data center 350 may further include a report generator 360, which generates a monthly vehicle status report that may be communicated (emailed, for example) to the vehicle owner 372 to indicate any issues that have been observed and recommend any maintenance issue(s) or "watch" notice(s). In accordance with some implementations, this information may be combined with messages that are sent by similar OEM diagnostic-based systems such as the OnStar® vehicle diagnostics email sent to OnStar® subscribers. In further implementations, if the owner 372 is not a subscriber to OnStar® or a similar service, the PAS engine 354 may communicate an email directly to the owner 372. Thus, many implementations are contemplated, which are within the scope of the appended claims.

In accordance with some implementations, the PAS engine 354 correlates the information across the vehicle make/model/year to provide an early warning to the OEMs of potential warranty or recall issues. Similar services may be provided to fleet owners, such as rental companies and corporate fleet owners. The tier one automotive suppliers may also receive information from the PAS engine 354 regarding the performance of their major systems within each make/model to also provide early warning of potential warranty and recall issues. For example, the tier one automotive suppliers may be communicated information by the PAS engine 354 indicating that the performance of a steering component across a model year of a certain make/model has maintenance or safety issues.

Figure 4:
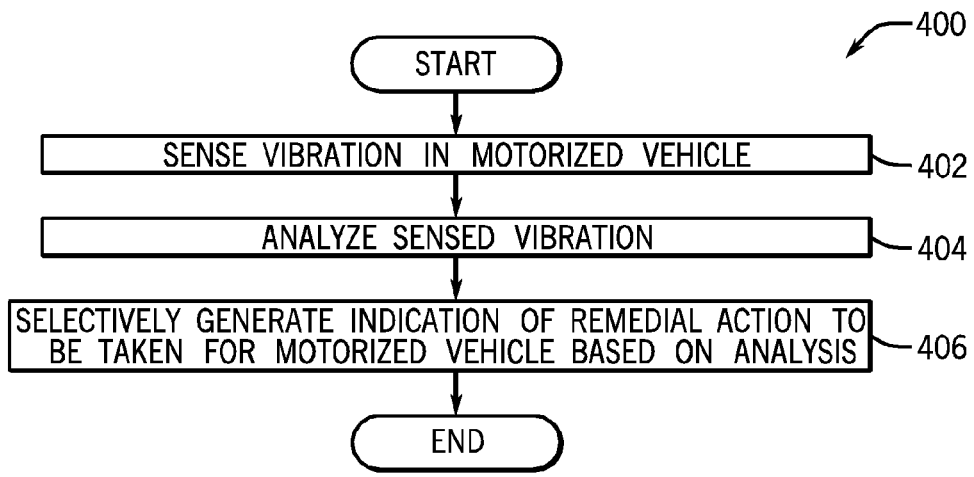
FIG. 4 is a flow diagram depicting a technique to use sensed vibration to identify a remedial action to be taken for a motorized vehicle according to an exemplary implementation.

Thus, to summarize, referring to FIG. 4, in accordance with exemplary implementations, a technique 400 includes sensing (block 402) vibration in a motorized vehicle and analyzing (block 404) the sensed vibration. An indication of a remedial action to be taken for the motorized vehicle is selectively generated, pursuant to block 406, based on this analysis.

Figure 5:
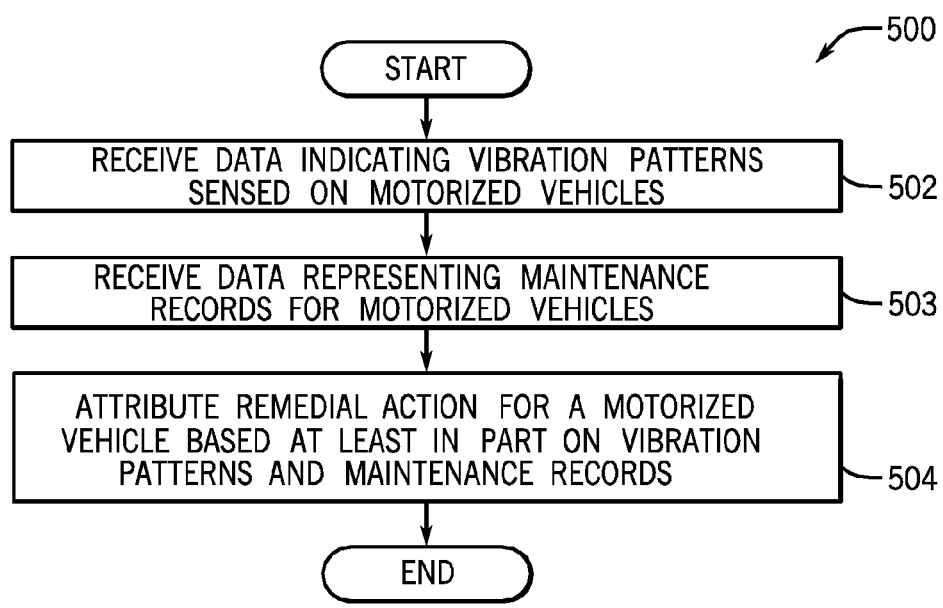
FIG. 5 is a flow diagram depicting a technique to populate motorized vehicle-based vibration noise pattern databases according to an exemplary implementation.

Attributing vibration patterns to specific remedial actions for the motorized vehicles may occur pursuant to a technique 500 of FIG. 5. The technique 500 includes receiving data (block 502), which represents vibration patterns sensed on motorized vehicles and receiving data (block 503) that represents maintenance records for the vehicles. The technique 500 includes attributing (block 504) a remedial action for a motorized vehicle based at least in part on the vibration patterns and the maintenance records.

Figure 6:
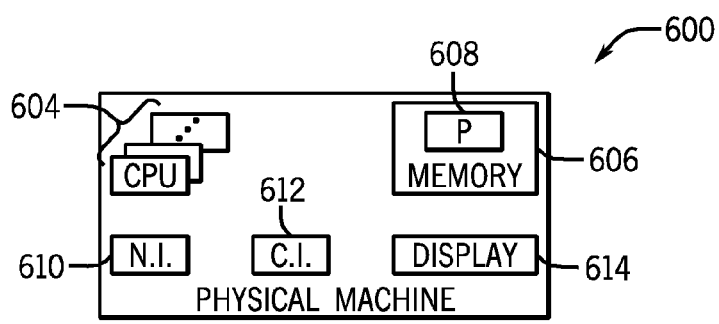
FIG. 6 is a schematic diagram of a physical machine according to an exemplary implementation.

Referring to back to FIG. 3, in accordance with exemplary implementations, the onboard diagnostic system 304 as well as the data center 350 are each physical machines made up of real hardware and software. In this regard, in accordance with some implementations, a physical machine that is depicted in FIG. 6 may be employed. The physical machine 600 includes one or multiple central processing units (CPUs) 604, which execute machine executable instructions 608 that are stored in a memory 606. The memory 606 may be a non-transitory storage medium, such semiconductor-based storage, magnetic-based storage, optical storage, removable media, a combination of such media, and so forth, depending on the particular implementation.

The machine executable instructions 608, when executed by the CPU(s) 604 may cause the CPU(s) 604 to form one or more of the engines/modules depicted in FIG. 3, such as the RTVA engine 306, the event alert module 314, the new pattern update module 324, the report generator 360, the PAS engine 354, and so forth. In addition to the CPU(s) 604, the physical machine 600 may further include other hardware, such as a network interface 610, a cellular interface 612, a display 614, and so forth. It is noted that although the physical machine 600 is depicted in FIG. 6 as being contained in a box (or rack), the machine 600 may employ a distributed architecture (such as for the data center 350), in which the machine 600 includes equipment at more than one location.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. An apparatus comprising:
a vibration sensor to sense a vibration of a motorized vehicle; and
a circuit to
compare the sensed vibration to previously recognized vibration patterns corresponding to maintenance and safety issues,
based on the comparison, determine whether the sensed vibration corresponds to a maintenance issue or an immediate safety issue,
in response to a determination that the sensed vibration corresponds to a maintenance issue, transmit data indicative of the sensed vibration to a remotely disposed data center for storage and analysis, and
in response to a determination that the sensed vibration corresponds to an immediate safety issue, display an alert on an onboard display of the motorized vehicle to alert an operator of the motorized vehicle.

2. The apparatus of claim 1, wherein the circuit is to determine a remedial action based at least in part on the comparison of the sensed vibration to the previously recognized vibration patterns.

3. The apparatus of claim 1, further comprising:
a communication interface,
wherein the circuit is to use the interface to communicate a signal indicative of a remedial action to a database at the data center remotely disposed from the motorized vehicle.

4. The apparatus of claim 3, wherein the signal is indicative of a first occurrence of the sensed vibration, and the circuit is further to provide daily updates to the remote database after the first occurrence of the sensed vibration.

5. The apparatus of claim 4, wherein the circuit is further to communicate a daily log indicating a daily number of trips and a duration of each of the daily number of trips after the first occurrence of the sensed vibration.

6. The apparatus of claim 1, wherein the circuit is to use the display to provide a remedial action for the sensed vibration.

7. A method comprising:
sensing, by a vibration sensor in a motorized vehicle, a vibration of the motorized vehicle;
comparing, by a circuit in the motorized vehicle, the sensed vibration to previously recognized vibration patterns corresponding to maintenance and safety issues;
based on the comparison, determining, by the circuit, whether the sensed vibration corresponds to a maintenance issue or an immediate safety issue;
in response to a determination that the sensed vibration corresponds to a maintenance issue, transmitting data indicative of the sensed vibration to a remotely disposed data center for storage and analysis; and
in response to a determination that the sensed vibration corresponds to an immediate safety issue, displaying an alert on an onboard display of the motorized vehicle.

8. The method of claim 7, wherein the data center receives data indicative of the vibration patterns from a plurality of motorized vehicles.

9. The method of claim 8, further comprising updating at least one of the motorized vehicles from which the data indicative of the vibration patterns is received with data representing an association between each of the vibration patterns and a remedial action.

10. The method of claim 7, wherein displaying the alert includes display a remedial action for the sensed vibration, wherein the remedial action is based on previously diagnosed problems to vibration patterns of a plurality of motorized vehicles.

11. An article comprising a non-transitory computer accessible storage medium to store instructions that when executed by a processor-based system cause the processor-based system to:
sense a vibration in a motorized vehicle;
compare the sensed vibration to previously recognized vibration patterns corresponding to maintenance and safety issues;
based on the comparison, determine whether the sensed vibration corresponds to a maintenance issue or an immediate safety issue;
in response to a determination that the sensed vibration corresponds to a maintenance issue, transmit data indicative of the sensed vibration to a remotely disposed data center for storage and analysis; and
in response to a determination that the sensed vibration corresponds to an immediate safety issue, display an alert on an onboard display of the motorized vehicle to alert an operator of the motorized vehicle.

12. The article of claim 11, the non-transitory computer accessible storage medium storing instructions that when executed by the processor-based system cause the processor-based system to identify a pattern associated with the sensed vibration and compare the pattern of the sensed vibration to the previously recognized vibration patterns associated with known causes.

13. The article of claim 11, the non-transitory computer accessible storage medium storing instructions that when executed by the processor-based system cause the processor-based system to communicate a signal from the motorized vehicle to a database at the data center remotely disposed from the motorized vehicle, the signal being indicative of a remedial action.

\* \* \* \* \*